United States Patent
Niemeyer et al.

(10) Patent No.: US 9,416,715 B2
(45) Date of Patent: Aug. 16, 2016

(54) METHOD FOR MONITORING AN EXHAUST SYSTEM OF AN INTERNAL COMBUSTION ENGINE

(71) Applicant: MTU Friedrichshafen GmbH, Friedrichshafen (DE)

(72) Inventors: Jens Niemeyer, Friedrichshafen (DE); Aron Toth, Friedrichshafen (DE); Tim Spaeder, Langenargen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 119 days.

(21) Appl. No.: 14/350,106

(22) PCT Filed: Oct. 5, 2012

(86) PCT No.: PCT/EP2012/004173
§ 371 (c)(1),
(2) Date: Apr. 7, 2014

(87) PCT Pub. No.: WO2013/050167
PCT Pub. Date: Apr. 11, 2013

(65) Prior Publication Data
US 2015/0033837 A1    Feb. 5, 2015

(30) Foreign Application Priority Data
Oct. 7, 2011    (DE) .......... 10 2011 115 328

(51) Int. Cl.
*G01M 15/10*   (2006.01)
*F01N 11/00*   (2006.01)
*F01N 3/20*    (2006.01)
*F01N 9/00*    (2006.01)

(52) U.S. Cl.
CPC ............. *F01N 11/002* (2013.01); *F01N 3/20* (2013.01); *F01N 3/2066* (2013.01); *F01N 11/005* (2013.01); *G01M 15/102* (2013.01); *F01N 9/005* (2013.01); *F01N 9/007* (2013.01); *F01N 2550/02* (2013.01); *F01N 2550/24* (2013.01); *F01N 2560/06* (2013.01); *F01N 2900/1404* (2013.01); *Y02T 10/24* (2013.01); *Y02T 10/47* (2013.01)

(58) Field of Classification Search
CPC ..... F01N 9/005; F01N 11/002; F01N 11/005; F01N 2550/02; F01N 2550/24; F01N 2560/06; G01M 15/10
USPC ............................ 73/114.69, 114.75, 114.77
See application file for complete search history.

(56) References Cited

U.S. PATENT DOCUMENTS

| | | |
|---|---|---|
| 5,428,956 A | 7/1995 | Maus et al. |
| 5,647,205 A | 7/1997 | Wier et al. |
| 5,675,967 A | 10/1997 | Ries-Mueller |
| 6,739,176 B2 | 5/2004 | Neuhausen et al. |

(Continued)

FOREIGN PATENT DOCUMENTS

| | | |
|---|---|---|
| DE | 4027207 | 3/1992 |
| DE | 4211092 | 10/1993 |

(Continued)

*Primary Examiner* — Eric S McCall
(74) *Attorney, Agent, or Firm* — Lucas & Mercanti, LLP; Klaus P. Stoffel

(57) ABSTRACT

A method and an arrangement for monitoring an exhaust system of an internal combustion engine. Temperature profiles upstream and downstream of an installation location of a catalytic converter are measured in order to determine whether or not a catalytic converter is installed.

9 Claims, 7 Drawing Sheets

(56) References Cited

U.S. PATENT DOCUMENTS

| | | |
|---|---|---|
| 8,557,553 B2 | 10/2013 | Hansen et al. |
| 2008/0041035 A1 | 2/2008 | Sawada et al. |
| 2008/0083271 A1 | 4/2008 | He et al. |
| 2008/0314133 A1 | 12/2008 | Brinkmeier et al. |
| 2011/0143449 A1 | 6/2011 | Lana et al. |
| 2012/0186226 A1* | 7/2012 | Ren ............... F01N 3/103 60/274 |

FOREIGN PATENT DOCUMENTS

| | | |
|---|---|---|
| DE | 4308894 | 9/1994 |
| EP | 2181191 | 5/2010 |
| RU | 2267619 C2 | 1/2006 |

* cited by examiner

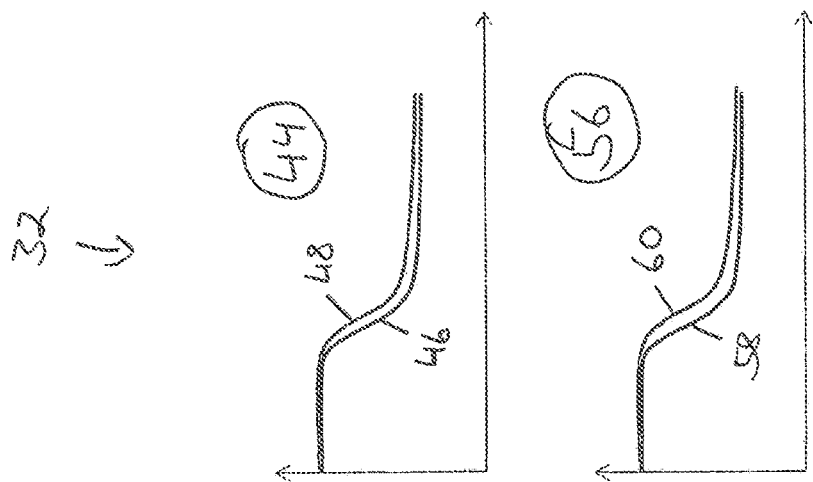
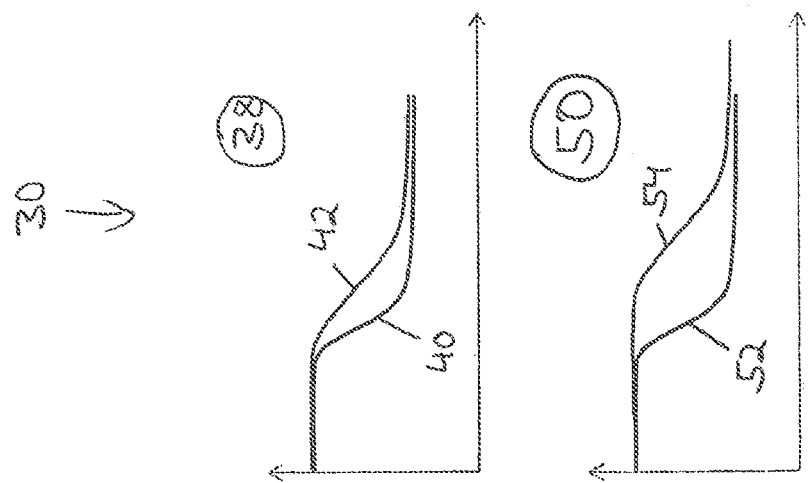
Fig. 2

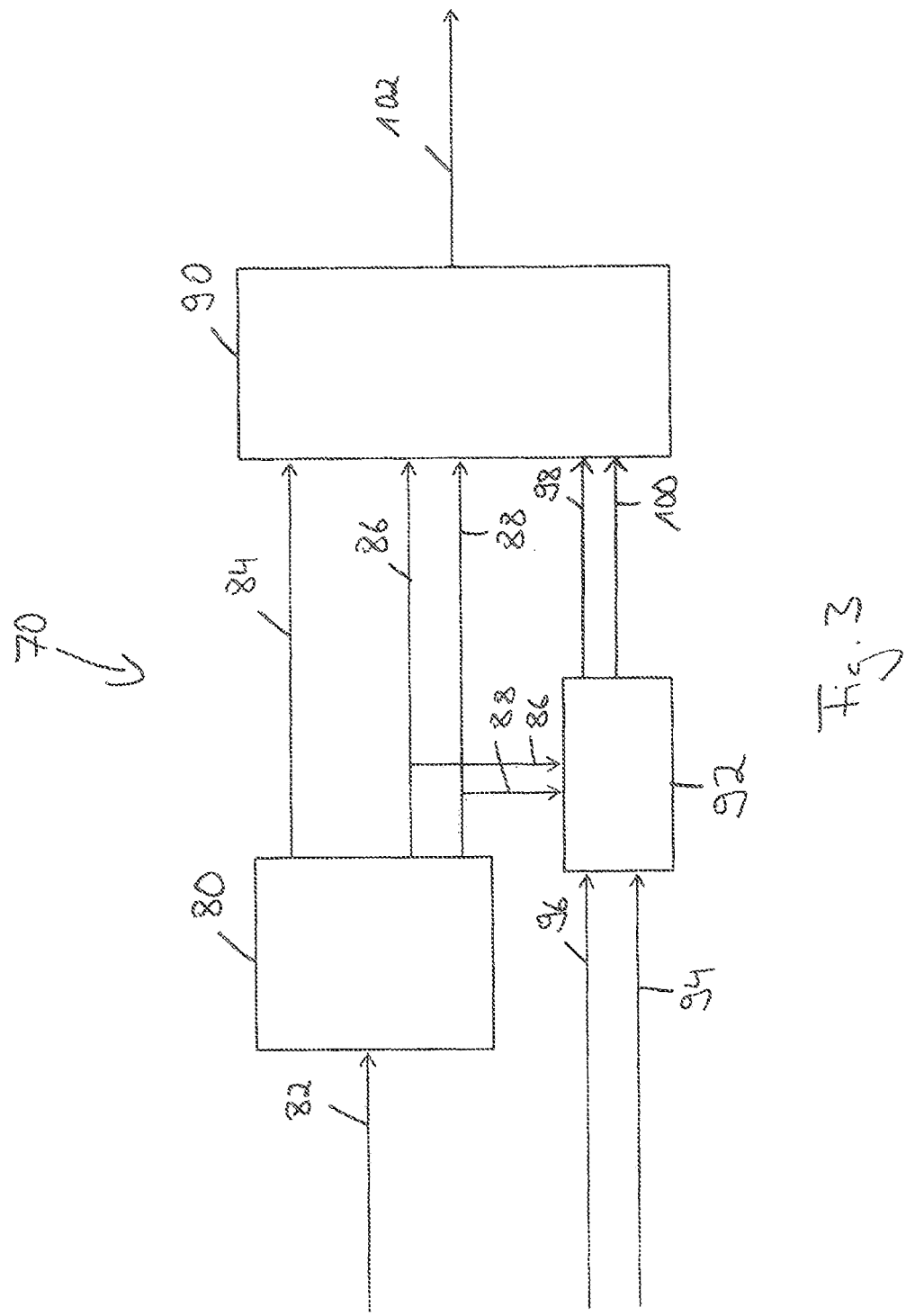

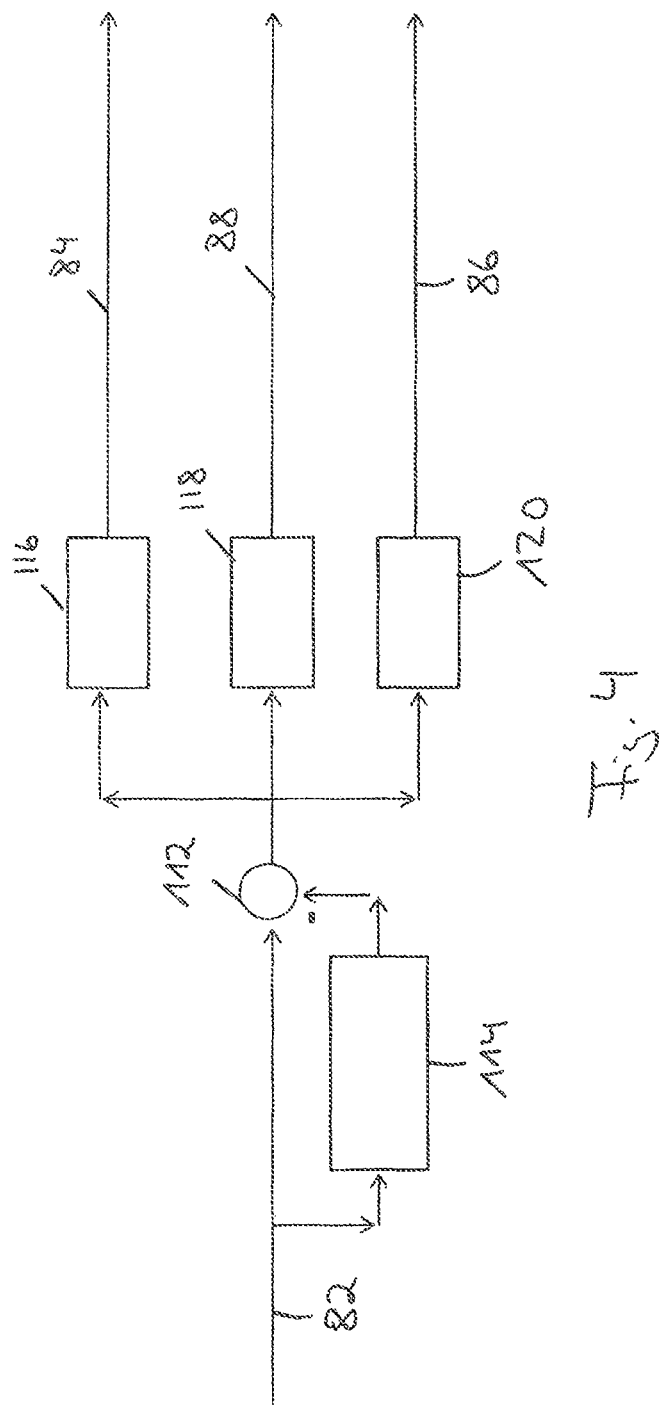

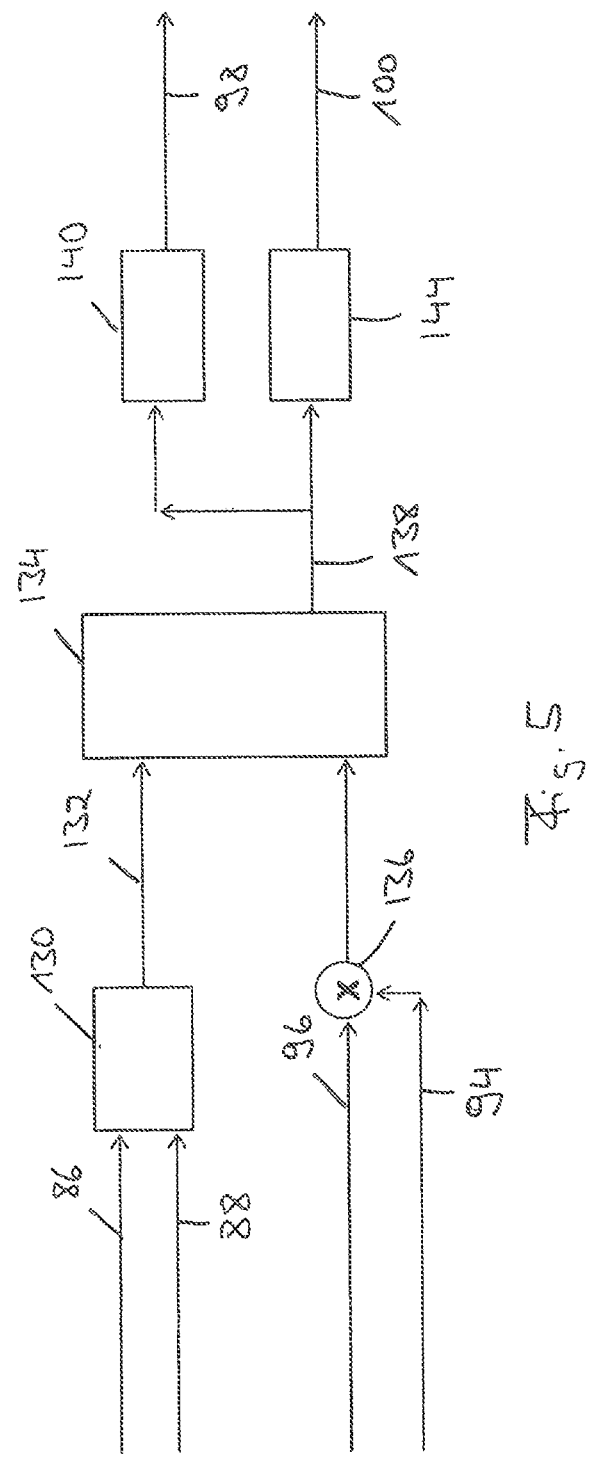

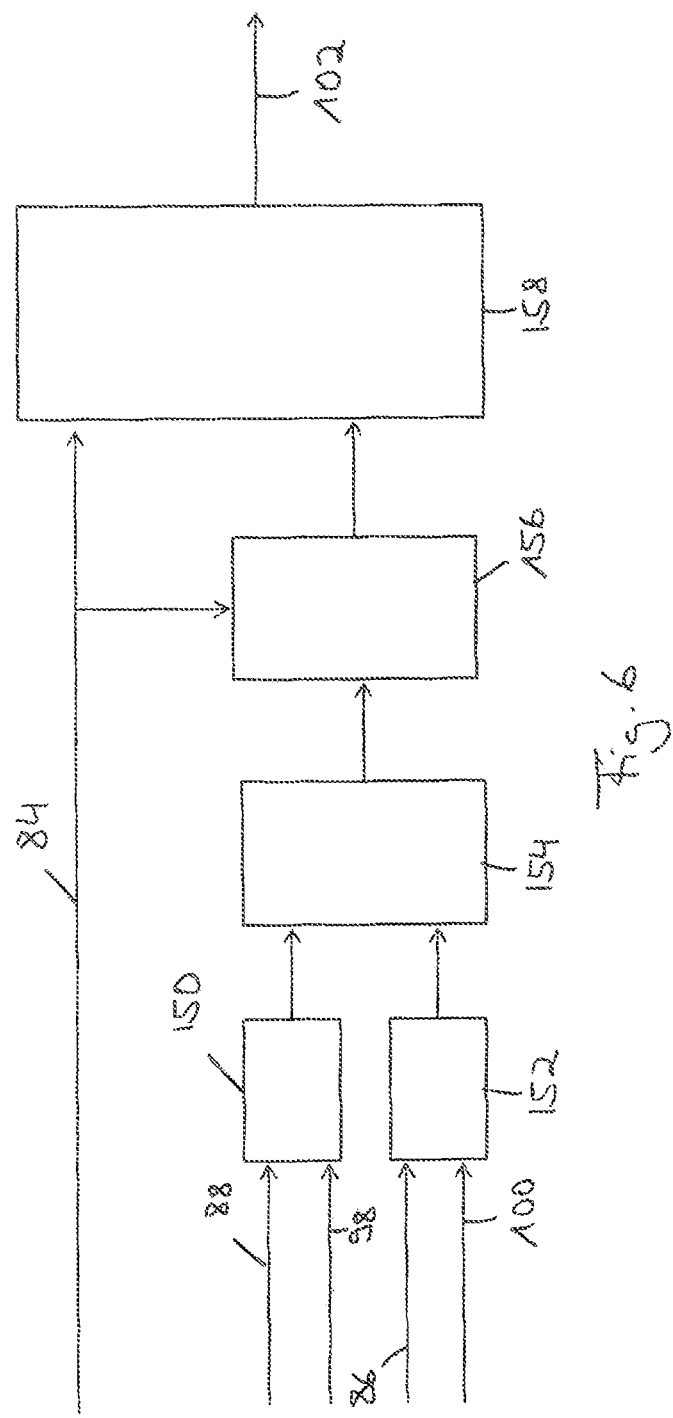

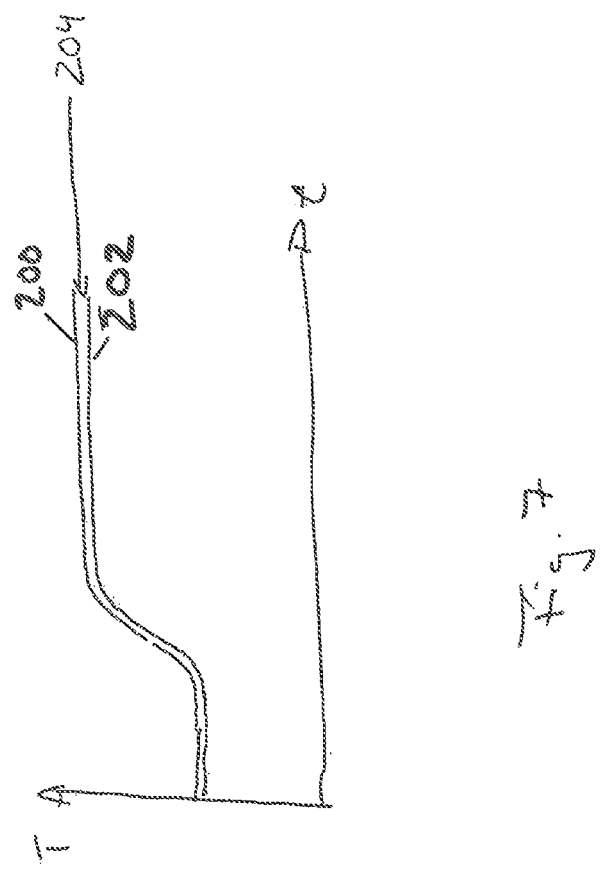

METHOD FOR MONITORING AN EXHAUST SYSTEM OF AN INTERNAL COMBUSTION ENGINE

The present application is a 371 of international application PCT/EP2012/004173, filed Oct. 5, 2012, which claims priority of DE 10 2011 115 328.8, filed Oct. 7, 2011, the priority of these applications is hereby claimed and these applications are incorporated herein by reference.

BACKGROUND OF THE INVENTION

The invention relates to a method and an arrangement for monitoring an exhaust system.

Exhaust systems are used for breaking down the pollutant fractions of the exhaust gases that are generated during the operation of an internal combustion engine. The remaining exhaust gases are then discharged. The exhaust system is generally composed of multiple parts, specifically one or more silencers, pipes and a catalytic converter.

Catalytic converters in particular serve for exhaust-gas treatment or for aftertreatment in order to reduce pollutant emissions in the exhaust gas. Here, various types of catalytic converters are known, such as for example three-way catalytic converters, unregulated catalytic converters, oxidation catalytic converters and SCR catalytic converters. In SCR catalytic converters, for example, use is made of so-called selective catalytic reduction (SCR) as a method for the reduction of nitrogen oxides.

To monitor the functionality of the catalytic converter, various methods are known.

Document DE 40 27 207 A1 describes a method for monitoring the catalytic activity of a catalytic converter in the exhaust system of an internal combustion engine, in which method signals that are output by measurement sensors assigned to the catalytic converter are evaluated. Here, signals from at least two measurement sensors are recorded, the detected measurement variables are observed over a relatively long time period, and an average value is formed. The catalytic activity is determined by comparison of the mean value with a predefined threshold value.

Document DE 43 08 894 A1 discloses a method for testing the conversion of a catalytic converter in motor vehicles with internal combustion engines. The testing is performed by means of a temperature measurement upstream and downstream of the catalytic converter, wherein a temperature difference is determined. The testing is in this case performed during overrun operation of the motor vehicle. The catalytic converter is regarded as functional if, inter alia, the temperature difference increases and the temperature downstream of the catalytic rotor lies in a predefined range during the test.

Document DE 42 11 092 A1 describes a method and a device for assessing the functionality of a catalytic converter. In said method, use is made of the knowledge that the temperature at which conversion begins in the catalytic converter rises with the degree of aging of the catalytic converter.

Document US 2011/0143449 A1 describes a method for monitoring an exhaust system, in which method it is established whether or not a catalytic converter is present. For this purpose, a measured time delay is compared with an estimated time delay.

To check whether a catalytic converter has been removed, it is known to arrange a differential pressure sensor across the catalytic converter. Said differential pressure sensor has the task of identifying whether a catalytic converter is installed, or whether said catalytic converter has for example been removed by the operator. In many applications, the differential pressure sensor is installed only for the purposes of identifying an empty pipe. This incurs additional costs.

SUMMARY OF THE INVENTION

A method for monitoring the functionality of an exhaust system is proposed, which method makes it possible to check whether or not a catalytic converter is installed.

The described method serves for the monitoring of an exhaust system of an internal combustion engine, which exhaust system is provided for discharging, in a flow direction, exhaust gases that are generated by the internal combustion engine. Here, in the exhaust system, there is provided an installation location suitable for the installation of a catalytic converter, wherein a first temperature profile is measured upstream of the installation location as viewed in the flow direction of the exhaust gas and a second temperature profile is measured downstream of the installation location as viewed in the flow direction. An expected temperature profile downstream of the installation location is determined on the basis of the measured first temperature profile upstream of the installation location, and the determined expected temperature profile downstream of the installation location is compared with the measured second temperature profile downstream of the installation location in order to determine whether the catalytic converter is installed at the installation location. The comparison consists in an area between the two temperature profiles, the determined or expected temperature profile downstream of the installation location and measured temperature profile downstream of the installation location, being evaluated.

The method is expediently carried out during a temperature step change.

It may be provided that the expected temperature profile downstream of the installation location is determined by means of a simulation, for example by means of an online simulation.

In one embodiment, if there is a predefinable deviation between the determined expected temperature profile downstream of the installation location and the measured second temperature profile downstream of the installation location, a fault is recorded in a memory.

Said memory may be read out at predefined time intervals.

Alternatively or in addition, the memory may be read out if a first temperature profile upstream of the installation location is constant.

Also proposed is an arrangement for monitoring an exhaust system of an internal combustion engine, which exhaust system is provided for discharging, in a flow direction, exhaust gases that are generated by the internal combustion engine. The arrangement serves in particular for carrying out a method of the type described above. Here, in the exhaust system, there is provided an installation location suitable for the installation of a catalytic converter, wherein the arrangement has a first temperature sensor for measuring a first temperature profile upstream of the installation location as viewed in the flow direction and has a second temperature sensor for measuring a temperature profile downstream of the installation location as viewed in the flow direction, wherein the arrangement is designed to determine an expected temperature profile downstream of the installation location on the basis of the measured first temperature profile upstream of the installation location and to compare the determined expected temperature profile downstream of the installation location with the measured second temperature profile downstream of the installation location in order to determine whether or not the catalytic converter is installed at the installation location. The comparison provides an evaluation of an area between the two temperature profiles.

In one embodiment, the arrangement has a memory for recording a fault if there is a predefinable deviation between the determined expected temperature profile downstream of the installation location and the measured second temperature profile downstream of the installation location.

The method is suitable in particular for all applications with SCR catalytic converters, wherein a differential pressure sensor is not required.

It is thus made possible to test whether a catalytic converter has been removed. A removal would result in non-compliance with regard to emissions.

The temperature profiles are determined by means of existing temperature sensors upstream and downstream of the catalytic converter. The temperature profiles are processed and compared with one another in a suitable manner taking into consideration the exhaust-gas mass flow rate. At the instant at which an exhaust-gas temperature step change takes place, it is expected that there will be a certain time offset between the two temperature profiles. If this is not the case, it can be assumed that a catalytic converter has been removed.

The use of a differential pressure sensor across the catalytic converter, which has the task inter alia of identifying whether a catalytic converter is installed or has been removed by the operator, is thus omitted. Costs for sensors, cabling, hoses and maintenance costs are thus saved. Furthermore, the exhaust-gas aftertreatment reactor can be of simpler design, because the number of measurement connectors that have to be installed is reduced by two.

Further advantages and refinements of the invention will emerge from the description and from the appended drawing.

It is self-evident that the features mentioned above and the features yet to be explained below can be used not only in the respectively specified combination but also in other combinations or individually without departing from the scope of the present invention.

The invention is schematically illustrated on the basis of embodiments in the drawing and will be described in detail below with reference to the drawing.

BRIEF DESCRIPTION OF THE DRAWING

FIG. 2 shows temperature profiles in four graphs.

FIG. 3 shows, in a flow diagram, an implementation of the method for testing an exhaust system by means of a described arrangement.

FIG. 4 shows, in a flow diagram, a method for steady-state identification.

FIG. 5 shows, in a flow diagram, a method for taking into consideration the exhaust-gas flow rate.

FIG. 6 shows, in a flow diagram, the procedure for an evaluation in an evaluation logic circuit provided for the purpose.

FIG. 7 shows temperature profiles.

DETAILED DESCRIPTION OF THE INVENTION

Figure 1:
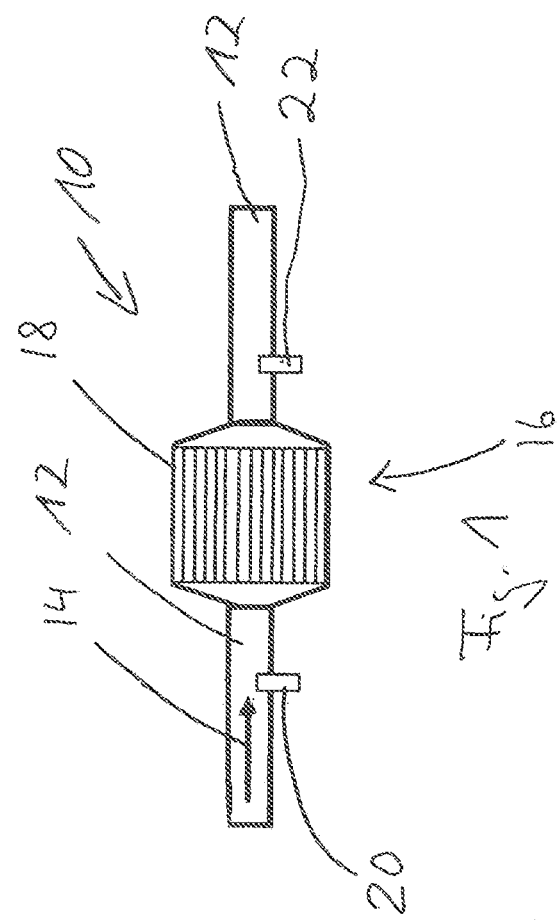
FIG. 1 shows an embodiment of the described exhaust system.

FIG. 1 shows, in a schematic illustration, an exhaust system which is denoted as a whole by reference numeral 10. The illustration shows an exhaust tract 12 in which exhaust gas is discharged in a flow direction (arrow 14). In the exhaust tract 12 and thus in the exhaust system 10, a catalytic converter 18 is provided at an installation location 16, through which catalytic converter the exhaust gas in the exhaust tract 12 flows in order to undergo treatment or aftertreatment and in order for pollutant fractions in the exhaust gas to be reduced.

A first temperature sensor 20 is arranged upstream of the installation location 16 and thus upstream of the catalytic converter 18 as viewed in the flow direction 14, and a second temperature sensor 22 is provided downstream of the installation location 16 as viewed in the flow direction 14.

FIG. 2 shows, in four graphs, temperature profiles upstream and downstream of a catalytic converter or an installation location in the event of a temperature step change. Here, temperature profiles when a catalytic converter is present are illustrated in a first column 30, and temperature profiles when a catalytic converter has been removed are illustrated in a second column 32. Temperature profiles in the case of a high exhaust-gas flow rate are shown in a first row 34, and temperature profiles in the case of a low exhaust-gas flow rate are shown in a second row 36. In each of the graphs illustrated, the temperature in ° C. is plotted on an ordinate versus the time in s on an abscissa.

A first graph 38 shows a first temperature profile 40 which represents the profile of the temperature upstream of an installation location in the event of a temperature step change. A second temperature profile 42 shows the corresponding profile of the temperature downstream of the installation location.

A second graph 44 shows a first temperature profile 46 which represents the profile of the temperature upstream of an installation location in the event of a temperature step change. A second temperature profile 48 shows the corresponding profile of the temperature downstream of the installation location.

A third graph 50 shows a first temperature profile 52 which represents the profile of the temperature upstream of an installation location in the event of a temperature step change. A second temperature profile 54 shows the corresponding profile of the temperature downstream of the installation location.

A fourth graph 56 shows a first temperature profile 58 which represents the profile of the temperature upstream of an installation location in the event of a temperature step change. A second temperature profile 60 shows the corresponding profile of the temperature downstream of the installation location.

The four graphs 38, 44, 50 and 56 illustrate that a missing catalytic converter has the effect that the two temperature profiles 40 and 42, 46 and 48, 52 and 54, and 58 and 60, respectively, move closer together in the region of the temperature step change. The catalytic converter thus has an influence on the temperature profile downstream of the installation location. As can be clearly seen in the second row 36, said influence is far more pronounced at low exhaust-gas mass flow rates. The omission of a catalytic converter can be clearly identified in particular in the event of a temperature step change.

FIG. 3 shows, in a flow diagram, an implementation of the method for testing an exhaust system. For this purpose, the illustration shows an embodiment of the described arrangement, which is denoted as a whole by the reference numeral 70.

In a first block 80 (dynamic/steady-state identification), it is identified whether a temperature step change is present. For this purpose, the temperature (T_pre_cat_measurement) upstream of the installation location is recorded (signal 82). It is thus established whether a positive temperature step change or a negative temperature step change is present. Corresponding outputs are provided for whether the temperature is constant or in a steady state (signal 84), a positive step change (signal 86) or a negative step change (signal 88) is present. This information is transmitted to an evaluation logic circuit 90 and a second block 92 which takes into consideration the exhaust-gas mass flow rate.

The second block 92 (deviation integrator) receives as inputs the exhaust-gas mass flow rate (signal 94) and a signal 96 which takes into consideration a delta between a temperature measurement and a simulation (delta_temperature_measurement_simulation) and thus a difference of the temperature measurement downstream of the installation location with respect to a simulation of the temperature downstream of the catalytic converter (T_post_cat_measurement−T_post_cat_simulation). Said second block 92 outputs a signal 98 relating to a possible positive deviation and a signal 100 relating to a possible negative deviation.

In the evaluation logic circuit 90, a possible positive or negative deviation is integrated, and taking into consideration the difference of the measurement of the temperature upstream of the installation location with respect to the temperature downstream of the installation location, it is determined whether an empty pipe fault (signal 102) is present. If it is thus established that the catalytic converter is not installed at the installation location, that is to say there is an empty pipe fault, the corresponding signal 102 (empty_pipe_fault) can be output.

FIG. 4 illustrates, in a flow diagram, a method for steady-state identification and thus the method that is carried out in the first block 80 in FIG. 3.

Values of the temperature measurement upstream of the installation location are taken into consideration (signal 82). Said values are supplied to a subtraction element 112 both directly and also via a delay element 114. The delay is for example 10 seconds. A temperature step change can be identified in this way.

If no temperature step change is present or if a temperature step change lies below a predefinable threshold, a first unit 116 (Abs<Limit) outputs the corresponding signal 84 (temperature in steady state). If a negative step change is identified, a second unit 118 (>Limit) outputs the corresponding signal 88 (negative step change). In the case of a positive step change, a third unit 120 (<−Limit) outputs the corresponding signal 86 (positive step change).

FIG. 5 illustrates, in a flow diagram, a method for taking into consideration the exhaust-gas flow rate, and thus the method that is carried out in the second block 92 in FIG. 3.

An OR element 130 receives as inputs the signal 86, which indicates a positive step change, and the signal 88, which indicates a negative step change. If a negative or a positive step change is present, an enable signal 132 is generated and input into an integrator 134. As further inputs, said integrator 134 receives, via a multiplication element 136, the signal 96, which takes into consideration a delta between a temperature measurement and a simulation (delta_temperature_measurement_simulation) and thus a difference of the temperature measurement downstream of the installation location with respect to a simulation of the temperature downstream of the catalytic converter (T_post_cat_measurement−T_post_cat_simulation), and the signal 94, which characterizes the exhaust-gas mass flow rate. The integrator 134 performs integration for as long as the enable signal 132 is generated.

The integrator 134 outputs a signal 138 which constitutes an indicator for an empty pipe fault (fault_empty_pipe_indicator). If the value of the signal 138 is higher than a threshold, a first unit 140 outputs the signal 98 which indicates a positive deviation. If the value of the signal 138 lies below a negative threshold, then a second unit 144 (<−Limit) outputs the signal 100 which indicates a negative deviation.

During a temperature step change, there is an excessively large deviation if no catalytic converter is present. The difference between the expected and the real temperature downstream of the installation location is multiplied by the exhaust-gas mass flow rate and integrated.

FIG. 6 shows, in a flow diagram, the procedure for the method in the evaluation logic circuit 90 in FIG. 3. A first AND element 150 receives as inputs the signal 88, which characterizes a negative step change, and the signal 98, which indicates a positive deviation. A second AND element 152 receives as inputs the signal 86, which indicates a positive step change, and the signal 100, which characterizes a negative deviation. The outputs of the two AND elements 150 and 152 are fed to an OR element 154. Thus, if a positive deviation is identified in the event of a negative step change or a negative deviation is identified in the event of a positive step change, a fault is recorded in a memory 156. Said memory 156 is read out if the temperature is constant (signal 84) and then evaluated in a unit 158 which counts the faults. If a predefinable threshold is exceeded, the signal 102 (empty_pipe_fault) is output.

Thus, in one refinement, during a temperature step change, it is always checked whether an excessively large deviation is present. If so, this is stored as a fault. Said fault can, during a temperature step change, be counted only as one fault.

The following equations apply:

$$T\_post\_cat\_simulation = f(\text{exhaust-gas mass flow rate}, T\_pre\_cat\_measurement)$$

$$\Delta\_temperature\_measurement\_simulation = T\_post\_cat\_measurement - T\_post\_cat\_simulation,$$

$$fault\_empty\_pipe\_indicator = \int_{Enable\ 0 \to 1}^{Enable\ 1 \to 0} \Delta\_temperature\_measurement\_simulation * \text{exhaust-gas mass flow rate} * dt$$

An evaluation of the temperature sensors is thus performed with respect to an online simulation. If the simulation and the model deviate, this is a fault which may indicate that a catalytic converter is not present.

By virtue of the fact that the exhaust-gas mass flow rate is taken into consideration, the evaluation functions at all engine operating points because the fault_empty_pipe_indicator corresponds to the lack of energy in the exhaust system.

FIG. 7 shows a graph in which temperature profiles are plotted against time. A first profile 200 shows the calculated, that is to say the determined, expected temperature profile downstream of the catalytic converter, and a second profile 202 shows the measured profile downstream of the catalytic converter. The two profiles 200 and 202 are compared with one another by virtue of an area 204 between the two being evaluated. This is performed for example by integration. If the area 204 is larger than a predefined value, then it is inferred that a catalytic converter is not present. If the area 204 is lower than the value, then it is assumed that a catalytic converter is present.

As presented here, the method may be carried out in the event of a temperature step change. This is however not imperatively necessary. In the evaluation of the area, it is also possible for the exhaust-gas mass flow rate to be taken into consideration, for example by multiplication.

The invention claimed is:

1. A method for monitoring an exhaust system of an internal combustion engine, which exhaust system is provided for discharging, in a flow direction, exhaust gases that are generated by the internal combustion engine, wherein, in the exhaust system, there is provided an installation location suitable for the installation of a catalytic converter, the method comprising the steps of:
- measuring a first temperature profile upstream of the installation location as viewed in a flow direction of the exhaust gas;
- measuring a second temperature profile downstream of the installation location as viewed in the flow direction;
- determining an expected temperature profile downstream of the installation location based on the measured first temperature profile upstream of the installation location; and
- comparing the determined expected temperature profile downstream of the installation location with the measured second temperature profile downstream of the installation location to determine whether the catalytic converter is installed at the installation location, wherein the expected temperature profile and the measured second temperature profile are plotted and an area between the plots of the two profiles is evaluated.

2. The method as claimed in claim 1, wherein the method is carried out during a temperature step change.

3. The method as claimed in claim 1, wherein the expected temperature profile downstream of the installation location is determined using a simulation.

4. The method as claimed in claim 1, wherein the exhaust system has an SCR catalytic converter.

5. The method as claimed in claim 1, further including recording a fault in a memory when there is a predefinable deviation between the determined expected temperature profile downstream of the installation location and the measured second temperature profile downstream of the installation location.

6. The method as claimed in claim 5, further including reading out contents of the memory at predefinable time intervals.

7. The method as claimed in claim 5, further including reading out contents of the memory out when a first temperature profile upstream of the installation location is constant.

8. An arrangement for monitoring an exhaust system of an internal combustion engine, which exhaust system is provided for discharging, in a flow direction, exhaust gases that are generated by the internal combustion engine, wherein, in the exhaust system, there is an installation location suitable for installation of a catalytic converter, wherein the arrangement comprises:
- a first temperature sensor for measuring a first temperature profile upstream of the installation location as viewed in a flow direction; and
- a second temperature sensor for measuring a temperature profile downstream of the installation location as viewed in the flow direction, wherein the arrangement determines an expected temperature profile downstream of the installation location based on the measured first temperature profile upstream of the installation location and compares the determined expected temperature profile downstream of the installation location with the measured second temperature profile in order to determine whether the catalytic converter is installed at the installation location, wherein the expected temperature profile and to the measured second temperature profile are plotted and an area between the plots of the two profiles is evaluated.

9. The arrangement as claimed in claim 8, further comprising a memory for recording a fault when there is a predefinable deviation between the determined expected temperature profile downstream of the installation location and the measured second temperature profile downstream of the installation location.

* * * * *